United States Patent
Pan et al.

(10) Patent No.: US 6,923,533 B2
(45) Date of Patent: Aug. 2, 2005

(54) PHASE CHANGE INK IMAGING COMPONENT WITH NANO-SIZE FILLER

(75) Inventors: David H. Pan, Rochester, NY (US); Santokh S. Badesha, Pittsford, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 10/316,234

(22) Filed: Dec. 9, 2002

(65) Prior Publication Data

US 2004/0109055 A1 Jun. 10, 2004

(51) Int. Cl.$^7$ ............................................... B41J 2/01
(52) U.S. Cl. ............................................... 347/103
(58) Field of Search ............... 101/217; 399/144, 399/308, 318; 428/36.8, 36.9, 319.3, 442, 447, 448, 450, 906, 195, 212; 492/56; 524/504, 557; 347/101–106, 85, 88, 99; 427/256, 258, 261, 301, 333

(56) References Cited

U.S. PATENT DOCUMENTS

| | | | |
|---|---|---|---|
| 4,372,246 A | 2/1983 | Azar et al. ................... 118/60 |
| 4,517,342 A * | 5/1985 | Ryang ......................... 525/431 |
| 4,728,687 A * | 3/1988 | Watanabe et al. ............ 524/493 |
| 5,021,802 A | 6/1991 | Allred .......................... 346/1.1 |
| 5,389,958 A | 2/1995 | Bui et al. ..................... 347/103 |
| 5,569,750 A * | 10/1996 | Knepper et al. ............. 524/731 |
| 5,645,888 A * | 7/1997 | Titterington et al. ........ 427/256 |
| 5,736,250 A * | 4/1998 | Heeks et al. ................. 428/447 |
| 5,741,841 A * | 4/1998 | Badesha et al. ............. 524/379 |
| 5,763,117 A * | 6/1998 | Wright et al. ................ 429/104 |
| 5,841,462 A * | 11/1998 | Matsuo et al. .............. 347/213 |
| 6,009,298 A * | 12/1999 | Sakamaki et al. ........... 399/318 |
| 6,207,280 B1 * | 3/2001 | Atarashi et al. ............. 428/403 |
| 6,336,963 B1 | 1/2002 | Malhotra et al. ........ 106/31.29 |
| 6,648,467 B1 * | 11/2003 | Pan et al. .................... 347/103 |

FOREIGN PATENT DOCUMENTS

| EP | 1 205 821 A2 | 5/2002 | |
| JP | 09096986 A * | 4/1997 | .......... G03G/15/20 |

* cited by examiner

Primary Examiner—Stephen Meier
Assistant Examiner—An H. Do
(74) Attorney, Agent, or Firm—Annette L. Bade

(57) ABSTRACT

An offset printing apparatus having a coated imaging member for use with phase-change inks, has a substrate, an optional intermediate layer, and thereover an outer coating with a nano-size filler having an average particle size of from about 1 to about 250 nanometers, and an optional heating member associated with the offset printing apparatus.

23 Claims, 2 Drawing Sheets

PHASE CHANGE INK IMAGING COMPONENT WITH NANO-SIZE FILLER

CROSS REFERENCE TO RELATED APPLICATIONS

Reference is made to the following commonly assigned, copending patent applications, including U.S. patent application Ser. No. 10/177,911 (D/A1022), filed Jun. 20, 2002, entitled, "Phase Change Ink Imaging Component Having Elastomer Outer Layer;" U.S. patent application Ser. No. 10/177,909 (D/A1022Q), filed Jun. 20, 2002, entitled, "Phase Change Ink Imaging Component with Outer Layer Having Haloelastomer with Pendant Chains;" U.S. patent application Ser. No. 10/177,780 (D/A1022Q1), filed Jun. 20, 2002, entitled, "Phase Change Ink Imaging Component with Thermoplastic Layer;" U.S. patent application Ser. No. 10/177,907 (D/A1022Q2), filed Jun. 20, 2002., entitled, "Phase Change Ink Imaging Component with Thermoset Layer;" U.S. patent application Ser. No. 10/177,800 (D/A1022Q3), filed Jun. 20, 2002, entitled, "Phase Change Ink Imaging Component with Fluorosilicone Layer;" U.S. patent application Ser. No. 10/177,906 (D/A1022Q4), filed Jun. 20, 2002, entitled, "Phase Change Ink Imaging Component with Latex Fluoroelastomer Layer;" U.S. patent application Ser. No. 10/177,904 (D/A1022Q5), filed Jun. 20, 2002, entitled, "Phase Change Ink Imaging Component with Mica-Type Silicate Layer;" U.S. patent application Ser. No. 10/177,910 (D/A1022Q6), filed Jun. 20, 2002, entitled, "Phase Change Ink Imaging Component with Q-Resin Layer;" U.S. Pat. No. 6,648,467 (D/A1022Q7), issued Nov. 18, 2003, entitled, "Phase Change Ink Imaging Component with Polymer Blend Layer," U.S. patent application Ser. No. 10/177,908 (D/A1022Q8), filed Jun. 20, 2002, entitled, "Phase Change Ink Imaging Component with Polymer Hybrid Layer." and U.S. patent application Ser. No. 10/316,213 (D/A1652), filed Dec. 9, 2002, entitled, "Phase Change Ink Imaging Component with Nano-size Zinc Oxide Filler." The disclosures of each of these patent applications is hereby incorporated by reference in their entirety.

BACKGROUND OF THE INVENTION

The present invention relates generally to an imaging apparatus and layers for components thereof, and for use in offset printing or ink jet printing apparatuses. The layers herein are useful for many purposes including layers for transfer components, including transfix or transfuse components, imaging components, and like components. More specifically, the present invention relates to layers comprising nano-size fillers. The layers of the present invention may be useful in components used in combination with ink, dye or pigment-based materials. In embodiments, the layers can be used in combination with phase change inks such as solid inks, gel-based inks, ultraviolet curable inks, and other phase-change inks.

Ink jet printing systems using intermediate transfer, transfix or transfuse members are well known, such as that described in U.S. Pat. No. 4,538,156. Generally, the printing or imaging member is employed in combination with a printhead. A final receiving surface or print medium is brought into contact with the imaging surface after the image has been placed thereon by the nozzles of the printhead. The image is then transferred and fixed to a final receiving surface.

More specifically, the phase-change ink imaging process begins by first applying a thin liquid, such as, for example, silicone oil, to an imaging member surface. The solid or hot melt ink is placed into a heated reservoir where it is maintained in a liquid state. This highly engineered ink is formulated to meet a number of constraints, including low viscosity at jetting temperatures, specific visco-elastic properties at component-to-media transfer temperatures, and high durability at room temperatures. Once within the printhead, the liquid ink flows through manifolds to be ejected from microscopic orifices through use of proprietary piezoelectric transducer (PZT) printhead technology. The duration and amplitude of the electrical pulse applied to the PZT is very accurately controlled so that a repeatable and precise pressure pulse can be applied to the ink, resulting in the proper volume, velocity and trajectory of the droplet. Several rows of jets, for example four rows, can be used, each one with a different color. The individual droplets of ink are jetted onto the liquid layer on the imaging member. The imaging member and liquid layer are held at a specified temperature such that the ink hardens to a ductile visco-elastic state.

After depositing the image, a print medium is heated by feeding it through a preheater and into a nip formed between the imaging member and a pressure member, either or both of which can also be heated. A high durometer synthetic pressure member is placed against the imaging member in order to develop a high-pressure nip. As the imaging member rotates, the heated print medium is pulled through the nip and is pressed against the deposited ink image with the help of a pressure member, thereby transferring the ink to the print medium. The pressure member compresses the print medium and ink together, spreads the ink droplets, and fuses the ink droplets to the print medium. Heat from the preheated print medium heats the ink in the nip, making the ink sufficiently soft and tacky to adhere to the print medium. When the print medium leaves the nip, stripper fingers or other like members, peel it from the printer member and direct it into a media exit path.

To optimize image resolution, the transferred ink drops should spread out to cover a predetermined area, but not so much that image resolution is compromised or lost. The ink drops should not melt during the transfer process. To optimize printed image durability, the ink drops should be pressed into the paper with sufficient pressure to prevent their inadvertent removal by abrasion. Finally, image transfer conditions should be such that nearly all the ink drops are transferred from the imaging member to the print medium. Therefore, it is desirable that the imaging member has the ability to transfer the image to the media sufficiently.

The imaging member is multi-functional. First, the ink jet printhead prints images on the imaging member, and thus, it is an imaging member. Second, after the images are printed on the imaging member, they can then transfixed or transfused to a final print medium. Therefore, the imaging member provides a transfix or transfuse function, in addition to an imaging function.

In order to ensure proper transfer and fusing of the ink off the imaging member to the print medium, certain nip temperature, pressure and compliance are required. Unlike laser printer imaging technology in which solid fills are produced by sheets of toner, the solid ink is placed on the imaging member one pixel at a time and the individual pixels must be spread out during the transfix process to achieve a uniform solid fill. Also, the secondary color pixels on the imaging member are physically taller than the primary color pixels because the secondary pixels are produced from two primary pixels. Therefore, compliance in the nip is required to conform around the secondary pixels and to allow the primary pixel neighbors to touch the media with enough pressure to spread and transfer. The correct amount of temperature, pressure and compliance is required to produce acceptable image quality.

Currently, the imaging member useful for solid inks or phase change inks comprises anodized aluminum. This member operates at about 57° C. to about 64° C. and can be used with a heater that preheats the print media prior to entering the nip. Otherwise, the imaging member may include a heater associated therewith. The heater may be associated anywhere on the offset printing apparatus. The current aluminum-imaging member has several drawbacks. A high nip load of up to about 770 pounds is needed for transfix or transfuse operations. Further, because of the high nip load, bulky mechanisms and supporting structures are needed, resulting in increased printer weight and cost. One example is that a fairly complex two-layer pressure roller is needed. In addition, the first copy out time is unacceptable because of the bulky weight. Moreover, low cohesive failure temperature is another drawback to use of an anodized aluminum drum.

Several coatings for the imaging member have been suggested. Examples are listed below.

U.S. Pat. No. 5,092,235 discloses a pressure fixing apparatus for ink jet inks having 1) outer shell of rigid, non-compliant material such as steel, or polymer such as acetal homopolymer or Nylon 6/6 and 2) an underlayer of elastomer material having a hardness of about 30 to 60, or about 50 to 60.

U.S. Pat. No. 5,195,430 discloses a pressure fixing apparatus for ink jet inks having 1) outer shell of rigid, non-compliant material such as steel, or polymer such as acetal homopolymer or Nylon 6/6 and 2) an underlayer of elastomer material having a hardness of about 30 to 60, or about 50 to 60, which can be polyurethane (VIBRATHANE, or REN:C:O-thane).

U.S. Pat. No. 5,389,958 discloses an intermediate transfer member/image receiving member having a surface of metal (aluminum, nickel, iron phosphate), elastomers (fluoroelastomers, perfluoroelastomers, silicone rubber, polybutadiene), plastics (polyphenylene sulfide), thermoplastics (polyethylene, polyamide (nylon), FEP), thermosets (metals, ceramics), and a pressure roller with elastomer surface.

U.S. Pat. No. 5,455,604 discloses a fixing mechanism and pressure wheels, wherein the pressure wheels can be comprised of a steel or plastic material such as DELRIN. Image-receiving drum 40 can be a rigid material such as aluminum or stainless steel with a thin shell mounted to the shaft, or plastic.

U.S. Pat. No. 5,502,476 teaches a pressure roller having a metallic core with elastomer coating such as silicones, urethanes, nitriles, or EPDM, and an intermediate transfer member surface of liquid, which can be water, fluorinated oils, glycol, surfactants, mineral oil, silicone oil, functional oils such as mercapto silicone oils or fluorinated silicone oils or the like, or combinations thereof.

U.S. Pat. No. 5,614,933 discloses an intermediate transfer member/image receiving member having a surface of metal (aluminum, nickel, iron phosphate), elastomers (fluoroelastomers, perfluoroelastomers, silicone rubber, polybutadiene), plastics (polyphenylene sulfide), thermoplastics (polyethylene, polyamide (nylon), FEP), thermosets (metals, ceramics), or polyphenylene sulfide loaded with PTFE, and a pressure roller with elastomer surface.

U.S. Pat. No. 5,790,160 discloses an intermediate transfer member/image receiving member having a surface of metal (aluminum, nickel, iron phosphate), elastomers (fluoroelastomers, perfluoroelastomers, silicone rubber, polybutadiene), plastics (polyphenylene sulfide), thermoplastics (polyethylene, polyamide (nylon), FEP), thermosets (metals, ceramics), or polyphenylene sulfide loaded with PTFE, and a pressure roller with elastomer surface.

U.S. Pat. No. 5,805,191 an intermediate transfer member/image receiving member having a surface of metal (aluminum, nickel, iron phosphate), elastomers (fluoroelastomers, perfluoroelastomers, silicone rubber, polybutadiene), plastics (polyphenylene sulfide), thermoplastics (polyethylene, polyamide (nylon), FEP), thermosets (metals, ceramics), or polyphenylene sulfide loaded with PTFE, and an outer liquid layer of liquid, which can be water, fluorinated oils, glycol, surfactants, mineral oil, silicone oil, functional oils such as mercapto silicone oils or fluorinated silicone oils or the like, or combinations thereof.

U.S. Pat. No. 5,808,645 discloses a transfer roller having a metallic core with elastomer covering of silicone, urethanes, nitriles, and EPDM.

U.S. Pat. No. 6,196,675 B1 discloses separate image transfer and fusing stations, wherein the fuser roller coatings can be silicones, urethanes, nitrites and EPDM.

U.S. Pat. No. 5,777,650 discloses a pressure roller having an elastomer sleeve, and an outer coating that can be metals, (aluminum, nickel, iron phosphate), elastomers (fluoroelastomers, perfluoroelastomers, silicone rubber, polybutadiene), plastics (polyphenylene sulfide with PTFE filler), thermoplastics (polyethylene, polyamide (nylon), FEP), thermosets (acetals, ceramics). Preferred is anodized aluminum.

In addition, many different types of outer coatings for transfer members, fuser members, and intermediate transfer members have been used in the electrostatographic arts using powder toner, but not with liquid inks or phase change inks. Several examples are listed herein.

U.S. Pat. No. 5,361,126 discloses an imaging apparatus including a transfer member including a heater and pressure-applying roller, wherein the transfer member includes a fabric substrate and an impurity-absorbent material as a top layer. The impurity-absorbing material can include a rubber elastomer material.

U.S. Pat. No. 5,337,129 discloses an intermediate transfer component comprising a substrate and a ceramer or grafted ceramer coating comprised of integral, interpenetrating networks of haloelastomer, silicon oxide, and optionally polyorganosiloxane.

U.S. Pat. No. 5,340,679 discloses an intermediate transfer component comprised of a substrate and thereover a coating comprised of a volume grafted elastomer, which is a substantially uniform integral interpenetrating network of a hybrid composition of a fluoroelastomer and a polyorganosiloxane.

U.S. Pat. No. 5,480,938 describes a low surface energy material comprising a volume grafted elastomer which is a substantially uniform integral interpenetrating network of a hybrid composition of a fluoroelastomer and a polyorganosiloxane, the volume graft having been formed by dehydrofluorination of fluoroelastomer by a nucleophilic dehydrofluorinating agent, followed by a hydrosilation reaction, addition of a hydrogen functionally terminated polyorganosiloxane and a hydrosilation reaction catalyst U.S. Pat. No. 5,366,772 describes a fuser member comprising a supporting substrate, and a outer layer comprised of an integral interpenetrating hybrid polymeric network comprised of a haloelastomer, a coupling agent, a functional polyorganosiloxane and a crosslinking agent.

U.S. Pat. No. 5,456,987 discloses an intermediate transfer component comprising a substrate and a titamer or grafted titamer coating comprised of integral, interpenetrating networks of haloelastomer, titanium dioxide, and optionally polyorganosiloxane.

U.S. Pat. No. 5,848,327 discloses an electrode member positioned near the donor member used in hybrid scavengeless development, wherein the electrode members have a composite haloelastomer coating.

U.S. Pat. No. 5,576,818 discloses an intermediate toner transfer component including: (a) an electrically conductive substrate; (b) a conformable and electrically resistive layer comprised of a first polymeric material; and (c) a toner release layer comprised of a second polymeric material selected from the group consisting of a fluorosilicone and a substantially uniform integral interpenetrating network of a hybrid composition of a fluoroelastomer and a polyorganosiloxane, wherein the resistive layer is disposed between the substrate and the release layer.

U.S. Pat. No. 6,035,780 discloses a process for forming a layer on a component of an electrostatographic apparatus, including mixing a first fluoroelastomer and a polymeric siloxane containing free radical reactive functional groups, and forming a second mixture of the resulting product with a mixture of a second fluoroelastomer and a second polysiloxane compound.

U.S. Pat. No. 5,537,194 discloses an intermediate toner transfer member comprising: (a) a substrate; and (b) an outer layer comprised of a haloelastomer having pendant hydrocarbon chains covalently bonded to the backbone of the haloelastomer.

U.S. Pat. No. 5,753,307 discloses fluoroelastomer surfaces and a method for providing a fluoroelastomer surface on a supporting substrate which includes dissolving a fluoroelastomer; adding a dehydrofluorinating agent; adding an amino silane to form a resulting homogeneous fluoroelastomer solution; and subsequently providing at least one layer of the homogeneous fluoroelastomer solution to the supporting substrate.

U.S. Pat. No. 5,840,796 describes polymer nanocomposites including a mica-type layered silicate and a fluoroelastomer, wherein the nanocomposite has a structure selected from the group consisting of an exfoliated structure and an intercalated structure.

U.S. Pat. No. 5,846,643 describes a fuser member for use in an electrostatographic printing machine, wherein the fuser member has at least one layer of an elastomer composition comprising a silicone elastomer and a mica-type layered silicate, the silicone elastomer and mica-type layered silicate form a delaminated nanocomposite with silicone elastomer inserted among the delaminated layers of the mica-type layered silicate.

U.S. Pat. No. 5,933,695 discloses a rapid wake up fuser member comprising a substrate, a heat transmissive layer provided on the substrate and having a silicone material and a Q-resin, and a toner release layer comprising a polymer and provided on the heat transmissive layer.

U.S. Pat. No. 4,853,737 discloses rollers having an outer layer comprising a cured fluoroelastomer containing pendant polydiorganosiloxane units that are covalently bonded to the backbone of the fluoroelastomer.

Some elastomer coatings have been shown to provide a multi-functional imaging member for use with phase change ink printing machines, which has the ability to receive an image, and either transfer, or transfer and fuse the image to a print medium. In addition, the imaging member having embodiments of elastomer coatings, has also been shown to be thermally stable for conduction for fusing or fixing. Moreover, the imaging member having certain elastomer coatings has been shown to have a relatively low nip load, in order to decrease the weight and cost of the printing machine, and in order to provide an acceptable first copy out time. Also, the elastomers enable low load, high temperature process for low unit manufacturing costs, and high speed printing. Further, some elastomers have been shown to increase print quality.

However, some disadvantages of the elastomeric imaging member coatings include the life shortfall versus the hard anodized component counterpart. The shortfall could be due to coating wear, peel-off from the imaging member substrate, external scratches, or other reasons.

Therefore, it is desired to provide a coating for an imaging member, which has the above superior qualities of elastomeric coatings, and which has an increased wear and life. It is further desired to provide improved surface wear resistance and improved gloss maintenance life against paper abrasion. In addition, it is desired to provide a coating with control over surface roughness and lower coefficient of friction.

SUMMARY OF THE INVENTION

The present invention provides, in embodiments: an offset printing apparatus for transferring a phase change ink onto a print medium comprising: a) a phase change ink component for applying a phase change ink in a phase change ink image; b) an imaging member for accepting the phase change ink image from the phase change ink component, and transferring the phase change ink image from the imaging member to the print medium, the imaging member comprising: i) an imaging substrate, and thereover ii) an outer coating comprising a nano-size filler having an average particle size of from about 1 to about 250 nanometers.

The present invention further provides, in embodiments: an offset printing apparatus for printing a phase change ink onto a print medium comprising: a) a phase change ink component for applying a phase change ink in a phase change ink image; b) an imaging member for accepting the phase change ink image from the phase change ink component, and transferring the phase change ink image from the imaging member to the print medium and for fixing the phase change ink image to the print medium, the imaging member comprising in order: i) an imaging substrate, ii) an intermediate layer, and iii) an outer coating comprising a nano-size filler having an average particle size of from about 1 to about 250 nanometers; and c) a heating member associated with the offset printing apparatus.

In addition, the present invention provides, in embodiments: an offset printing apparatus comprising a phase change ink component containing a phase change ink; an imaging member comprising a substrate, and thereover an outer coating comprising a nano-size filler having an average particle size of from about 1 to about 250 nanometers; and a heating member associated with the offset printing apparatus, wherein the phase change ink component dispenses the phase change ink onto the imaging member, and wherein the phase change ink is solid at room temperature.

BRIEF DESCRIPTION OF THE DRAWINGS

The above embodiments of the present invention will become apparent as the following description proceeds upon reference to the drawings, which include the following figures.

DETAILED DESCRIPTION OF THE INVENTION

The present invention is directed to an offset printing apparatus useful with phase-change inks such as solid inks, and comprising a coated imaging member capable of accepting, transferring and in some embodiments, fixing an ink image to a print medium. The imaging member can be a roller such as a drum, or a film component such as a film, sheet, belt or the like. In embodiments, the imaging member comprises a substrate and an outer layer comprising nano-size fillers dispersed or contained in the outer layer. In an alternative embodiment, the imaging member comprises a substrate, an optional intermediate layer, and outer layer comprising nano-size fillers dispersed or contained in the outer layer. The substrate, and/or intermediate layer may also comprise fillers, and even nano-size fillers, dispersed or contained therein.

The details of embodiments of phase-change ink printing processes are described in the patents referred to above, such as U.S. Pat. Nos. 5,502,476; 5,389,958; and 6,196,675 B1, the disclosures of each of which are hereby incorporated by reference in their entirety. An example of one embodiment of a phase-change ink printing process is set for the below.

Figure 1:
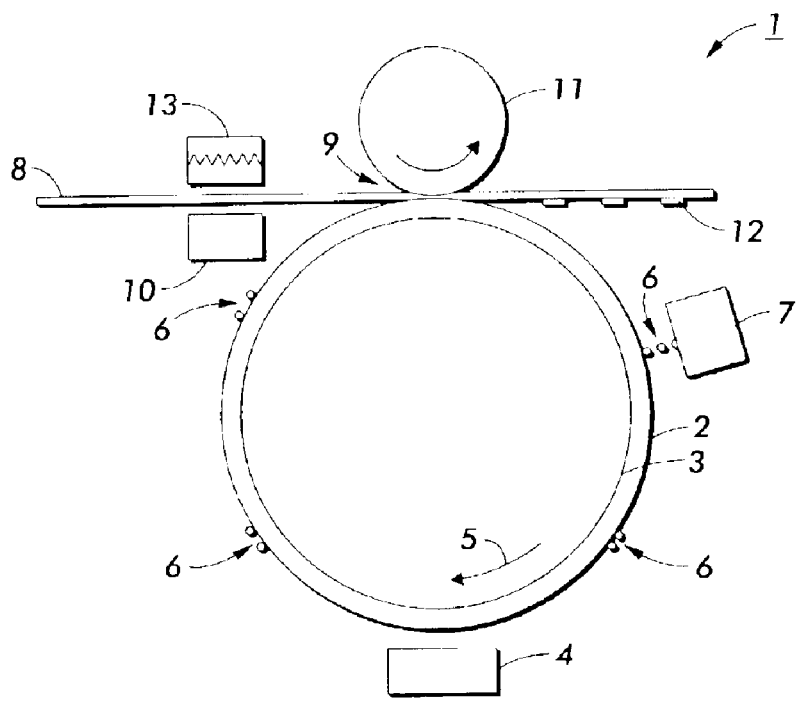
FIG. 1 is an illustration of an embodiment of the invention, and includes a transfer printing apparatus using an imaging member in the form of a drum.

Referring to FIG. 1, offset printing apparatus 1 is demonstrated to show transfer of an ink image from the imaging member to a final printing medium or receiving substrate. As the imaging member 3 turns in the direction of arrow 5, a liquid surface 2 is deposited on imaging member 3. The imaging member 3 is depicted in this embodiment as a drum member. However, it should be understood that other embodiments can be used, such as a belt member, film member, sheet member, or the like. The liquid layer 2 is deposited by an applicator 4 that may be positioned at any place, as long as the applicator 4 has the ability to make contact and apply liquid surface 2 to imaging member 3.

The ink used in the printing process can be a phase change ink, such as, for example, a solid ink. The term "phase change ink" means that the ink can change phases, such as a solid ink becoming liquid ink or changing from solid into a more malleable state. Specifically, in embodiments, the ink can be in solid form initially, and then can be changed to a molten state by the application of heat energy. The solid ink may be solid at room temperature, or at about 25° C. The solid ink may possess the ability to melt at relatively high temperatures above from about 85° C. to about 150° C. The ink is melted at a high temperature and then the melted ink 6 is ejected from printhead 7 onto the liquid layer 2 of imaging member 3. The ink is then cooled to an intermediate temperature of from about 20° C. to about 80° C., or about 72° C., and solidifies into a malleable state in which it can then be transferred onto a final receiving substrate 8 or print medium 8.

The ink has a viscosity of from about 5 to about 30 centipoise, or from about 8 to about 20 centipoise, or from about 10 to about 15 centipoise at about 140° C. The surface tension of suitable inks is from about 23 to about 50 dynes/cm. Examples of a suitable inks for use herein include those described in U.S. Pat. Nos. 4,889,560; 5,919,839; 6,174,937; and 6,309,453, the disclosure each of which are hereby incorporated by reference in their entirety.

Some of the liquid layer 2 is transferred to the print medium 8 along with the ink. A typical thickness of transferred liquid is about 100 angstroms to about 100 nanometer, or from about 0.1 to about 200 milligrams, or from about 0.5 to about 50 milligrams, or from about 1 to about 10 milligrams per print medium.

Suitable liquids that may be used as the print liquid surface 2 include water, fluorinated oils, glycol, surfactants, mineral oil, silicone oil, functional oils, and the like, and mixtures thereof. Functional liquids include silicone oils or polydimethylsiloxane oils having mercapto, fluoro, hydride, hydroxy, and the like functionality.

Feed guide(s) 10 and 13 help to feed the print medium 8, such as paper, transparency or the like, into the nip 9 formed between the pressure member 11 (shown as a roller), and imaging member 3. It should be understood that the pressure member can be in the form of a belt, film, sheet, or other form. In embodiments, the print medium 8 is heated prior to entering the nip 9 by heated feed guide 13. When the print medium 8 is passed between the printing medium 3 and the pressure member 11, the melted ink 6 now in a malleable state is transferred from the imaging member 3 onto the print medium 8 in image configuration. The final ink image 12 is spread, flattened, adhered, and fused or fixed to the final print medium 8 as the print medium moves between nip 9. Alternatively, there may be an additional or alternative heater or heaters (not shown) positioned in association with offset printing apparatus 1. In another embodiment, there may be a separate optional fusing station located upstream or downstream of the feed guides.

The pressure exerted at the nip 9 is from about 10 to about 1,000 psi., or about 500 psi, or from about 200 to about 500 psi. This is approximately twice the ink yield strength of about 250 psi at 50° C. In embodiments, higher temperatures, such as from about 72 to about 75° C. can be used, and at the higher temperatures, the ink is softer. Once the ink is transferred to the final print medium 8, it is cooled to an ambient temperature of from about 20° C. to about 25° C.

Stripper fingers (not shown) may be used to assist in removing the print medium 8 having the ink image 12 formed thereon to a final receiving tray (also not shown).

Figure 2:
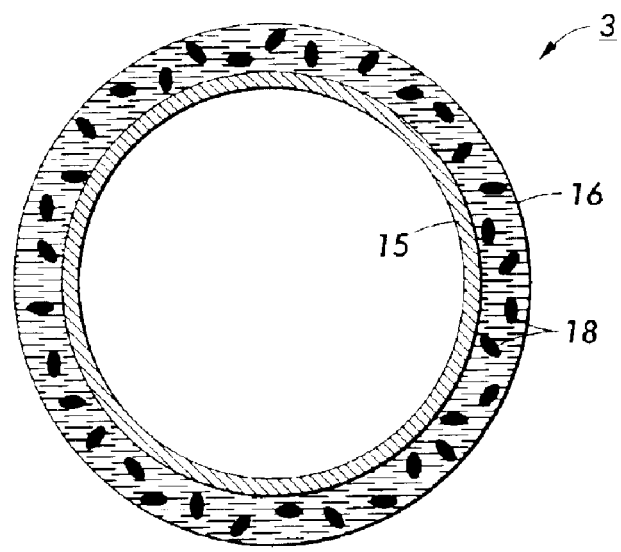
FIG. 2 is an enlarged view of an embodiment of a printing drum having a substrate and an outer layer thereon having nano-sized fillers dispersed or contained in the outer layer.

FIG. 2 demonstrates an embodiment of the invention, wherein imaging member 3 comprises substrate 15, having thereover outer coating 16 having nano-sized fillers 18 dispersed or contained therein.

Figure 3:
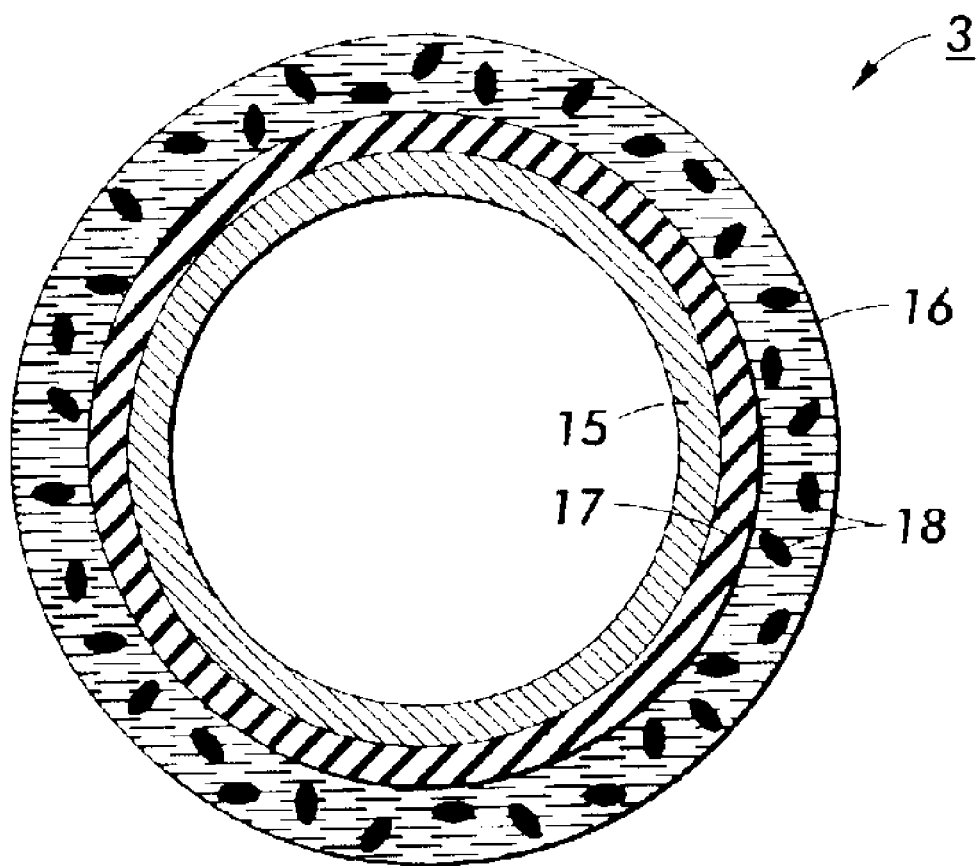
FIG. 3 is an enlarged view of an embodiment of a printing drum having a substrate, an optional intermediate layer, and an outer layer thereon having nano-sized fillers dispersed or contained in the outer layer.

FIG. 3 depicts another embodiment of the invention. FIG. 3 depicts a three-layer configuration comprising a substrate 15, intermediate layer 17 positioned on the substrate 15, and outer layer 16 positioned on the intermediate layer 17. Outer layer 16 comprises nano-size fillers 18 dispersed or contained therein. In embodiments, the substrate 15, and/or intermediate layer 16 may comprise nano-size fillers. In embodiments, an outer liquid layer 2 (as described above) may be present on the outer layer 16. In the Figures, the nano-size fillers are dramatically enlarged to show them.

In embodiments, the outer layer comprises an elastomer, such as a haloelastomer. Examples of elastomers comprising halogen monomers include chloroelastomers, fluoroelastomers and the like. Examples of fluoroelastomers include ethylenically unsaturated fluoroelastomers, and fluoroelastomers comprising copolymers and terpolymers of vinylidenefluoride, hexafluoropropylene and tetrafluoroethylene, which are known commercially under various designations as VITON A®, VITON B®, VITON E®, VITON F®, VITON E60C®, VITON E45®, VITON E430®, VITON B 910®, VITON GH®, VITON B50®, VITON E45®, and VITON GF®. The VITON® designation is a Trademark of E.I. DuPont de Nemours, Inc. Three known fluoroelastomers are (1) a class of copolymers of vinylidenefluoride, hexafluoropropylene and tetrafluoroethylene, known commercially as VITON A®, (2) a class of terpolymers of vinylidenefluoride, hexafluoropropylene and tetrafluoroethylene known commercially as VITON B®, and (3) a class of tetrapolymers of vinylidenefluoride, hexafluoropropylene, tetrafluoroethylene and a cure site monomer, for example, VITON® GF, VITON A®, and VITON B®.

In another embodiment, the fluoroelastomer is a tetrapolymer having a relatively low quantity of vinylidenefluoride. An example is VITON GF®, available from E.I. DuPont de Nemours, Inc. The VITON GF® has 35 weight percent of vinylidenefluoride, 34 weight percent of hexafluoropropylene and 29 weight percent of tetrafluoroethylene with 2 weight percent cure site monomer. The cure site monomer can be those available from DuPont such as 4-bromoperfluorobutene-1, 1,1-dihydro-4-bromoperfluorobutene-1, 3-bromoperfluoropropene-1, 1,1-dihydro-3-bromoperfluoropropene-1, or any other suitable, known, commercially available cure site monomer.

Other fluoroelastomers that may be used include AFLAS®, FLUOREL® I, FLUOREL® II, TECHNOFLON® and the like commercially available elastomers.

In embodiments, the outer layer may comprise a hybrid elastomer, a blend, a thermoplastic material, thermosetting material, a haloelastomer having pendant chains, a fluorosilicone material, a latex fluoroelastomer, a mica-type silicate material, a Q-resin, or other like material as described in the applications cited in the "Cross Reference to Related Applications."

The hardness of the outer layer is typically from about 10 to about 95 Shore A, or from about 60 to about 95 Shore A.

In embodiments, the thickness of the outer layer is from about 5 to about 250 microns, or from about 15 to about 150 microns, or from about 20 to about 25 microns.

In embodiments, the outer layer comprises a nano-size filler dispersed or contained therein. The substrate, optional intermediate layer, and/or outer layer, in embodiments, can comprise nano-size fillers dispersed therein. These fillers can have the ability to increase the material hardness or modulus into the desired range.

Examples of nano-size fillers include fillers having an average particle size of from about 1 to about 250 nanometers, or from about 5 to about 150 nanometers, or from about 10 to about 100 nanometers, or from about 20 to about 50 nanometers. Suitable nano-size fillers include fillers such as metals, metal oxides, carbon blacks, polymers, and sol-gel particles, and mixtures thereof, as long as they are nano-size. Examples of suitable nano-size metal oxide fillers include nano-size silicon oxide, aluminum oxide, chromium oxide, zirconium oxide, zinc oxide, tin oxide, iron oxide, magnesium oxide, manganese oxide, nickel oxide, copper oxide, conductive antimony pentoxide and indium tin oxide, and the like, and mixtures thereof. Other examples of nano-size fillers include high (HAF) or super (SAF) abrasion carbon black particles such as carbon black N110, N220, N330, N550 and N660, Regal 999, and conductive XC-72; thermally conducting carbon fillers; oxidized and reduced C 975U carbon black from Columbian and fluorinated carbon black such as ACCUFLUOR® or CARBOFLUOR®, and the like, and mixtures thereof. Examples of nano-size silica include silica from Degussa Aerosil 90, Aerosil 130, Aerosil 150, OX50, and PDMS coated L90 from Cabot, and the like and mixtures thereof. Examples of nano-sized polymer fillers include polytetrafluoroethylene, nano-size Q-resin and T-resin, polyimide, polyphenylene sulfide, poly(ether ether ketone), and the like, and mixtures thereof. Suitable metal oxides include those made by the sol-gel process. Examples of sol-gel nano-size particles include hydrolyzed metal alkoxides or aryloxides such as tetraalkoxy orthosilicates, titanium isbutoxide, and the like, and mixtures thereof.

The sol-gel particles may be grown inside the outer layer elastomer, in embodiments. The chemistry of the sol-gel process is shown below:

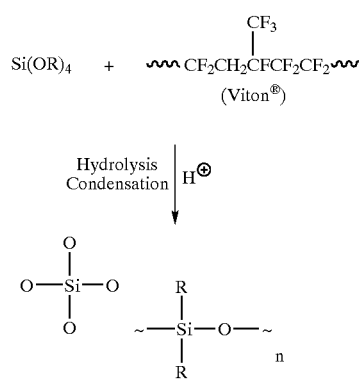

In the above scheme, n is a number of from about 1 to about 200, or from about 1 to about 50, or from about 1 to about 25.

In embodiments, the nano-size particles may be prepared in the elastomer matrix, by dissolving an effective amount of the elastomer, for example, from about 1 to about 35 percent by weight, or from about 5 to about 15 percent by weight of total solids, in an effective amount of a suitable solvent, such as an aliphatic hydrocarbon including for example methyl ethyl ketone, methyl isobutyl ketone, and the like, at any effective temperature, such as 25° C. Acetic acid catalyst is added in an effective amount, for example, from about 1 to about 15 percent by weight, or from about 3 to about 10 percent by weight relative to the weight of the elastomer, followed by stirring of the solution for about 15 to about 60 minutes at a temperature of about 45° C. to about 100° C. An effective amount of a silane compound such as tetraethoxyorthosilicate, for example, from about 1 to about 75 percent by weight, or from about 5 to about 50 percent by weight relative to the weight of elastomer, is then added and heating is continued at a temperature of about 4° C. to about 100° C. for an additional 20 minutes to about 10 hours. Any effective sequence of addition of the various components may be used to prepare this composition. For example, in embodiments, the elastomer may be added to a solvent already containing the acetic acid and/or the silane compound. The time of reaction is about 4 hours at about 65° C.

In embodiments, the process to prepare the nano-size silica particles in a elastomer matrix may also include other components to facilitate the preparation thereof. For example, a nucleophilic curing agent for the elastomer such as VITON® Curative No. 50 and diamines such as Diac available from E.I. Dupont deNemours, Inc. may be employed at an effective concentration, such as from about 1 to about 15 percent by weight, or from about 2 to about 10 percent by weight, relative to the weight of the elastomer. VITON® Curative No. 50, which incorporates an accelerator (a quaternary phosphonium salt or salts) and a crosslinking agent, such as bisphenol AF in a single curative system, may be added in a 3 to 7 percent solution predissolved to the elastomer compound. Also, the basic oxides such as MgO and/or Ca(OH)$_2$ in effective amounts, such as from about 0.5 to about 10 percent by weight, or from about 1 to about 3 percent by weight, relative to the weight of the elastomer, may be added in particulate form to the solution mixture.

The above mixture including the curative and the oxides, is then ball milled for about 2 to about 24 hours or from about 5 to about 15 hours to obtain a fine dispersion of the oxides. The curative component can also be added after ball milling in a solution form. The solution of the curative is generally prepared by dissolving VITON® Curative No. 50 in methyl ethyl ketone ("MEK") or methyl isobutyl ketone ("MIBK"). The concentration of the solids, can vary from about 5 percent to about 25 percent by weight or from about 10 to about 15 percent by weight.

Providing an effective layer of the polymer composite with nano-size silica particles on the substrate may be accomplished by any suitable known method such as by spraying, dipping, flow, web or the like to a level of film of from about 10 to about 150 microns in thickness or from about 50 to about 100 microns in thickness. The thickness of the overcoating is selected to provide a layer thick enough to allow a reasonable wear life. While molding, extruding and wrapping techniques are alternative means that may be used, in embodiments, flow coating of successive applications of the dispersion can be used. When the desired thickness of coating is obtained, the coating is cured, by any suitable known method, and thereby bonded to the surface. A typical step curing process is heating for about 2 hours at about 93° C., followed by about 2 hours at about 149° C., followed by about 2 hours at about 177° C., followed by about 16 hours at about 208° C.

The nano-size filler may be present in the substrate, optional intermediate layer, and/or outer layer in an amount of from about 1 to about 50 percent, or from about 1 to about 30 percent by weight of total solids in the layer. Total solids by weight, as used herein, refers to the total amount by weight of outer layer elastomer, fillers, additives, and any other solids.

The nano-size fillers provide antistatic properties to the outer layer in a highly conductive range of from about $10^4$ to about $10^{12}$ ohm-cm or from about $10^8$ to about $10^{10}$ ohm-cm.

The imaging substrate can comprise any material having suitable strength for use as an imaging member substrate. Examples of suitable materials for the substrate include metals, fiberglass composites, rubbers, and fabrics. Examples of metals include steel, aluminum, nickel, and their alloys, and like metals, and alloys of like metals. The thickness of the substrate can be set appropriate to the type of imaging member employed. In embodiments wherein the substrate is a belt, film, sheet or the like, the thickness can be from about 0.5 to about 500 mils, or from about 1 to about 250 mils. In embodiments wherein the substrate is in the form of a drum, the thickness can be from about 1/32 to about 1 inch, or from about 1/16 to about 5/8 inch.

Examples of suitable imaging substrates include a sheet, a film, a web, a foil, a strip, a coil, a cylinder, a drum, an endless strip, a circular disc, a belt including an endless belt, an endless seamed flexible belt, an endless seamless flexible belt, an endless belt having a puzzle cut seam, a weldable seam, and the like.

In an optional embodiment, an intermediate layer may be positioned between the imaging substrate and the outer layer. Materials suitable for use in the intermediate layer include silicone materials, elastomers such as fluoroelastomers, fluorosilicones, ethylene propylene diene rubbers, and the like, and mixtures thereof. In embodiments, the intermediate layer is conformable and is of a thickness of from about 2 to about 60 mils, or from about 4 to about 25 mils.

The nano-size filled coating has the superior qualities of the elastomeric coatings, and also increased wear and life. The nano-size filled coating also provides improved surface wear resistance and improved gloss maintenance life against paper abrasion.

Specific embodiments of the invention will now be described in detail. These examples are intended to be illustrative, and the invention is not limited to the materials, conditions, or process parameters set forth in these embodiments. All parts are percentages by weight of total solids as defined above unless otherwise indicated.

EXAMPLES

Example 1

Preparation of Nano-Sized Filled Fluoroelastomer Imaging Member Outer Layer

An aluminum substrate imaging member having the dimensions of about 10 inches long, about 4 inches in diameter, and about 0.25 inches thick, was first sanded with 400 grit sand paper, and cleaned with methyl ethyl ketone. The cleaned drum was then air dried, followed by compressed air treatment to remove residual dust particles. The cleaned drum was then coated uniformly with about 3 grams of a primer solution of Chemlok 5150 primer (an amino silane as identified by the manufacturer) solution (9:1 dilution with methanol), and allowed for hydrolysis. The primed aluminum base drum was then air dried and allowed for further primer hydrolysis for at least 30 minutes. The primed drum was usually coated within 48 hours of primer application.

A fluoroelastomer outer coating solution was prepared by mixing a fluoroelastomer (such as VITON® GF, VITON® B50, TECHNOFLON® P959, or the like), comprising a curative (VC-50, Diak III, or AO700), curative base metal oxides (magnesium oxide and/or calcium hydroxide) and nano-size fillers.

In an embodiment, VITON® B50 from DuPont Dow Elastomers was added at 100 ppm, along with 17.5 pph of nano-size silica Aerosil 130 from Degussa, Akron, Ohio (having a 20 nanometer filler particle size), 1.5 pph additive (N-330 carbon black colorant from R.T. Vanderbilt Company, Inc. Norwalk, Conn.), 5 pph VC-50 curative, 2 pph MgO, and 1 pph Ca(OH)$_2$. The mixture was then mixed with a paint-shaker until a uniform solution was obtained. The coating with the above fluoroelastomer solution having the nano-size filler was flow coated onto an imaging drum as described above, to a weight based thickness of from about 15 to about 100 microns. The percent extractables were less than about 5 percent, and the surface roughness was less than about 0.2 microns.

After the coating was air dried overnight, the coated imaging member was oven dried at 120° F. for about 4 hours, followed by step heat curing at 200° F. for 2 hours, 300° F. for 2 hours, 350° F. for 2 hours, 400° F. for 2 hours, and 450° F. for 6 hours. The final elastomer thickness was from about 15 to about 150 microns. The cured imaging member was then cooled to room temperature and ready for print testing.

The following Table 1 shows the materials and amounts used.

TABLE 1

| Components | Materials | Loading |
|---|---|---|
| Base elastomer | Viton B50 | 100 pph |
| Base filler | Nano-sized A130 | 17.5 pph |
| Filler particle size | ~20 nm | |
| Additive | N-330 CB colorant | 1.5 pph |
| Curative & catalyst | VC-50 | 5.0 pph |
| Base metal oxide 1 | MgO | 2.0 pph |
| Base metal oxide 2 | Ca(OH)$_2$ | 1.0 pph |
| Weight Based Thickness ($\mu$) | 20–25 | Demonstrated |
| % Extractables | <5% | 160K prints average |
| Surface roughness, $R_a$ ($\mu$) | <0.2 | life of machine |

Comparative Example 2
Preparation of Imaging Member Fluoroelastomer Outer Coating With Sub-Micron-Sized Filler The process for making a fluoroelastomer filled outer layer as in Example 1 was repeated, except that the following materials and amounts shown in Table 2, were substituted for the above ingredients shown in Table 1. The base filler was changed from a nano-size filler to a submicron-size filler, and the amount was increased for the submicron-size filler to 75 pph from 17.5 pph. Also, the additive was changed from a carbon black colorant at 1.5 pph, to a VITON Graft additive at 55 pph. In addition, the base elastomer was changed from VITON® B50 to VITON® GF.

TABLE 2

| Components | Materials | Loading |
|---|---|---|
| Base elastomer | Viton GF | 100 pph |
| Base filler | N-990 Carbon Blank | 75 pph |
| Filler particle size | ~0.5$\mu$ | |
| Additive | Viton Graft | 55 pph |
| Curative & catalyst | VC-50 | 5.0 pph |
| Base metal oxide 1 | MgO | 2.0 pph |
| Base metal oxide 2 | Ca(OH)$_2$ | 1.0 pph |
| Weight based thickness ($\mu$) | 40 | Gloss life |
| % Extractables | <10% | (~50K prints) |
| Surface roughness, $R_a$ ($\mu$) | ~0.2 | shortfall |

Example 3
Testing of the Fluoroelastomer Imaging Drum Coatings

The coated drums prepared in accordance with Examples 1 and 2 were tested in modified Phaser 860 lab solid ink printers.

The results are shown in Table 3 below.

TABLE 3

| Imaging Member | Number of prints with acceptable image gloss level |
|---|---|
| Example 1 (nano-sized filler) | 160,000 prints |
| Comparative Example 2 (submicron filler) | 50,000 prints |

The above results from Table 3 demonstrate that by use of the nano-size fillers, the imaging drum printed acceptable image gloss prints for the life of the machine, or 160,000 prints. Conversely, the imaging drum with the coating having submicron-size particles provided unfavorable results, and only printed 50,000 acceptable image gloss level prints.

The coating having the nano-size filler provides, in embodiments, control of surface roughness, lower coefficient of friction, less surface damage, durability against paper handling, and improved gloss life.

Example 4
Preparation of Sol-Gel Nano-Size Silica Particles in VITON® GF Layer

An aluminum substrate imaging member having the dimensions of about 10 inches long, about 4 inches in diameter, and about 0.25 inches thick, was first sanded with 400 grit sand paper, and cleaned with methyl ethyl ketone. The cleaned drum was then air dried, followed by treatment with compressed air to remove residual dust particles. The cleaned drum was then coated uniformly with about 3 grams of a primer solution of Chemlok 5150 primer (an amino silane as identified by the manufacturer) solution (9:1 dilution with methanol), and allowed for hydrolysis. The primed aluminum base drum was then air dried and allowed for further primer hydrolysis for at least 30 minutes. The primed drum was usually coated within 48 hours of primer application.

The polymer nanocomposite composition containing nano-size silica particles was prepared as follows. A stock solution of VITON® GF was prepared by dissolving 250 g of VITON® GF in 2.5 liters of methylethyl ketone (MEK) with stirring at room temperature. A four liter plastic bottle and a moving base shaker were used to prepare the stock solution. Approximately one hour to two hours was used to accomplish the dissolution. The above solution was then transferred to a four-liter Erlenmeyer flask and 25 ml of glacial acetic acid, which can be obtained from VWR Scientific Products of Cincinnati, Ohio. The contents of the flask were then stirred using a mechanical stirrer while maintaining the temperature between 55° C. and 60° C. After stirring for 30 minutes, 12.5 grams of tetraethoxy-orthosilicate (TEOS), available from Huls America Inc., was added and stirring continued for another five minutes. To this mixture, another aliquot of 12.5 grams of tetraethoxy-orthosilicate (TEOS) was added followed by 25 mils of acetic acid. The stirring was continued while heating the contents of the flask at around 65° C. for another 4 hours. The contents of the flask were then cooled to room temperature. Subsequently, 5 grams of magnesium oxide, 2.5 grams of calcium hydroxide and 12.5 grams of curative VC-50 available from Dow Chemical Co. were added. The above contents were then ball jarred with ceramic balls as media for 17 hours. This dispersion was then flow coated onto an imaging drum substrate. The dry film was then cured by the following heating procedure: 2 hours at 93° C., 2 hours at 149° C., 2 hours at 177° C., and thereafter heating for 16 hours at 208° C. The thickness of the cured film as determined by permoscope was found to be about 4 mils.

Example 5
Preparation of Sol-Gel Nano-Size Titania Particles in VITON® GF Layer

For precipitating nano size titania particles in the VITON® GF matrix, the procedure of Example 4 was repeated with the exception that instead of tetraethoxyorthosilicate, 12.5 grams of titanium isobutoxide was used. The final thinkness of the coating was determined to be about 3 mils.

Example 6
Preparation of Sol-Gel Nano-Size Silica Particles in VITON® GF Layer The procedure of Example 4 was repeated with the exception that the amount of tetraethoxyorthosilicate was 37.5 grams. A dry cured film of about 5 mils thickness was obtained.

Example 7
Preparation of Sol-Gel Nano-Size Titania Particles in VITON® GF Layer The procedure of Example 5 was repeated with the exception that the amount of titanium isobutoxide was 50 grams. A dry cured film of about 6 mils thickness was obtained.

While the invention has been described in detail with reference to specific and preferred embodiments, it will be appreciated that various modifications and variations will be apparent to the artisan. All such modifications and embodiments as may readily occur to one skilled in the art are intended to be within the scope of the appended claims.

We claim:

1. An offset printing apparatus for transferring a phase change ink onto a print medium comprising:
   a) a phase change ink component for applying a phase change ink in a phase change ink image; and
   b) an imaging member for accepting the phase change ink image from the phase change ink component, and transferring the phase change ink image from the imaging member to the print medium, the imaging member comprising:
      i) an imaging substrate, and thereover
      ii) an outer coating comprising a fluoroelastomer selected from the group consisting of 1) copolymers of vinylidenefluoride, hexafluoropropylene, and tetrafluoroethylene, 2) terpolymers of vinylidenefluoride, hexafluoropropylene and tetrafluoroethylene, and 3) tetrapolymers of vinylidenefluoride, hexafluoropropylene, tetrafluoroethylene, and a cure site monomer, and a nano-size filler having an average particle size of from about 1 to about 250 nanometers.

2. The offset printing apparatus of claim 1, wherein said average particle size is from about 5 to about 150 nanometers.

3. The offset printing apparatus of claim 2, wherein said average particle size is from about 10 to about 100 nanometers.

4. The offset printing apparatus of claim 1, wherein said nano-size filler is selected from the group consisting of metals, metal oxides, carbon blacks, polymers, and mixtures thereof.

5. The offset printing apparatus of claim 4, wherein said metal oxide is selected from the group consisting of silicon oxide, aluminum oxide, chromium oxide, zirconium oxide, zinc oxide, tin oxide, iron oxide, magnesium oxide, manganese oxide, nickel oxide, copper oxide, antimony pentoxide, indium tin oxide, and mixtures thereof.

6. The offset printing apparatus of claim 4, wherein said metal oxide is a sol-gel metal oxide.

7. The offset printing apparatus of claim 6, wherein said sol-gel metal oxide is selected from the group consisting of a hydrolyzed metal alkoxide and a hydrolyzed metal aryloxide.

8. The offset printing apparatus of claim 7, wherein said sol-gel metal oxide is selected from the group consisting of tetraalkoxy orthosilicate, titanium isobutoxide, and mixtures thereof.

9. The offset printing apparatus of claim 4, wherein said polymer is selected from the group consisting of polytetrafluoroethylene, polyimide, polyphenylene sulfide, poly (ether ether ketone), and mixtures thereof.

10. The offset printing apparatus of claim 1, wherein the fluoroelastomer comprises of 35 weight percent of vinylidenefluoride, 34 weight percent of hexafluoropropylene, 29 weight percent of tetrafluoroethylene, and 2 weight percent cure site monomer.

11. The offset printing apparatus of claim 1, wherein an intermediate layer is positioned between the substrate and the outer coating.

12. The offset printing apparatus of claim 11, wherein the intermediate layer comprises a material selected from the group consisting of elastomers and silicone materials.

13. The offset printing apparatus of claim 12, wherein the intermediate layer comprises a silicone rubber.

14. The offset printing apparatus of claim 1, wherein the phase change ink is solid at about 25° C.

15. The offset printing apparatus of claim 1, wherein the phase change ink comprises a dye.

16. The offset printing apparatus of claim 1, wherein said phase change ink comprises a pigment.

17. The offset printing apparatus of claim 1, wherein said phase change ink is a gel-based ink.

18. The offset printing apparatus of claim 1, wherein said phase change ink is an ultraviolet curable ink.

19. The offset printing apparatus of claim 1, wherein said average particle size is from about 20 to about 50 nanometers.

20. An offset printing apparatus for transferring a phase change ink onto a print medium comprising:
   a) a phase change ink component for applying a phase change ink in a phase change ink image; and
   b) an imaging member for accepting the phase change ink image from the phase change ink component, and transferring the phase change ink image from the imaging member to the print medium, the imaging member comprising:
      i) an imaging substrate, and thereover
      ii) an intermediate layer comprising a material selected from the group consisting of elastomers and silicone materials, and having thereon
      iii) an outer coating comprising a fluoroelastomer selected from the group consisting of 1) copolymers of vinylidenefluoride, hexafluoropropylene, and tetrafluoroethylene, 2) terpolymers of vinylidenefluoride, hexafluoropropylene and tetrafluoroethylene, and 3) tetrapolymers of vinylidenefluoride, hexafluoropropylene, tetrafluoroethylene, and a cure site monomer, and a nano-size filler having an average particle size of from about 1 to about 250 nanometers.

21. The offset printing apparatus of claim 20 wherein said intermediate layer comprises a silicone rubber.

22. An offset printing apparatus for printing a phase change ink onto a print medium comprising:
   a) a phase change ink component for applying a phase change ink in a phase change ink image;
   b) an imaging member for accepting the phase change ink image from the phase change ink component, and transferring the phase change ink image from the imaging member to the print medium and for fixing the phase change ink image to the print medium, the imaging member comprising in order:

i) an imaging substrate, ii) an intermediate layer, and iii) an outer coating comprising a fluoroelastomer selected from the group consisting of 1) copolymers of vinylidenefluoride, hexafluoropropylene, and tetrafluoroethylene, 2) terpolymers of vinylidenefluoride, hexafluoropropylene and tetrafluoroethylene, and 3) tetrapolymers of vinylidenefluoride, hexafluoropropylene, tetrafluoroethylene, and a cure site monomer, and a nano-size filler having an average particle size of from about 1 to about 250 nanometers; and c) a heating member associated with the offset printing apparatus.

23. An offset printing apparatus comprising:

a) a phase change ink component containing a phase change ink;

b) a imaging member comprising:

i) a substrate, and thereover ii) an outer coating comprising a fluoroelastomer selected from the group consisting of 1) copolymers of vinylidenefluoride, hexafluoropropylene, and tetrafluoroethylene, 2) terpolymers of vinylidenefluoride, hexafluoropropylene and tetrafluoroethylene, 3) tetrapolymers of vinylidenefluoride, hexafluoropropylene, tetrafluoroethylene, and a cure site monomer, and a nano-size filler having an average particle size of from about 1 to about 250 nanometers; and c) a heating member associated with the offset printing apparatus, wherein the phase change ink component dispenses the phase change ink onto the imaging member, and wherein the phase change ink is solid at about 25° C.

* * * * *